United States Patent
Ciubotariu et al.

(10) Patent No.: US 10,621,348 B1
(45) Date of Patent: Apr. 14, 2020

(54) DETECTING A MALICIOUS APPLICATION EXECUTING IN AN EMULATOR BASED ON A CHECK MADE BY THE MALICIOUS APPLICATION AFTER MAKING AN API CALL

(71) Applicant: CA, Inc., San Jose, CA (US)

(72) Inventors: Mircea Ciubotariu, Culver City, CA (US); Priti Nachiket More, Pune (IN)

(73) Assignee: CA, Inc., San Jose, CA (US)

( * ) Notice: Subject to any disclaimer, the term of this patent is extended or adjusted under 35 U.S.C. 154(b) by 143 days.

(21) Appl. No.: 15/678,096

(22) Filed: Aug. 15, 2017

(51) Int. Cl.
*G06F 21/56* (2013.01)
*G06F 21/53* (2013.01)

(52) U.S. Cl.
CPC ............ *G06F 21/566* (2013.01); *G06F 21/53* (2013.01)

(58) Field of Classification Search
CPC ............................... G06F 21/566; G06F 21/53
See application file for complete search history.

(56) References Cited

U.S. PATENT DOCUMENTS

| 9,178,900 | B1 * | 11/2015 | Li | H04L 63/145 |
| 9,413,774 | B1 * | 8/2016 | Liu | H04L 63/1416 |
| 10,162,966 | B1 * | 12/2018 | Huang | G06F 21/566 |
| 2008/0127292 | A1 * | 5/2008 | Cooper | G06F 21/53 |
| | | | | 726/1 |
| 2010/0293407 | A1 * | 11/2010 | Locasto | G06F 11/3672 |
| | | | | 714/2 |
| 2014/0096245 | A1 * | 4/2014 | Fischer | G06F 21/52 |
| | | | | 726/23 |
| 2014/0317745 | A1 * | 10/2014 | Kolbitsch | H04L 63/1416 |
| | | | | 726/24 |
| 2015/0213260 | A1 * | 7/2015 | Park | G06F 21/54 |
| | | | | 726/23 |
| 2016/0092183 | A1 * | 3/2016 | Radigan | G06F 8/4435 |
| | | | | 717/159 |
| 2016/0212159 | A1 * | 7/2016 | Gupta | G06F 21/54 |
| 2016/0259939 | A1 * | 9/2016 | Bobritsky | G06F 21/566 |
| 2017/0004309 | A1 * | 1/2017 | Pavlyushchik | G06F 9/544 |
| 2017/0132411 | A1 * | 5/2017 | Salajegheh | G06F 21/53 |
| 2017/0185536 | A1 * | 6/2017 | Li | G06F 12/1458 |
| 2017/0185777 | A1 * | 6/2017 | Li | G06F 21/567 |
| 2017/0185778 | A1 * | 6/2017 | Sahita | G06F 21/566 |
| 2017/0193223 | A1 * | 7/2017 | Striem-Amit | G06F 21/53 |
| 2017/0230388 | A1 * | 8/2017 | Pevny | G06F 21/552 |
| 2017/0277891 | A1 * | 9/2017 | Keppler | G06F 21/554 |

(Continued)

*Primary Examiner* — J. Brant Murphy
(74) *Attorney, Agent, or Firm* — Maschoff Brennan

(57) ABSTRACT

Detecting a malicious application executing in an emulator based on a check made by the malicious application after making an API call. In one embodiment, a method may include executing an application in an emulator that emulates a real-world computing environment. The method may also include detecting, in the application, an API call configured to accept a parameter and return a variable return value to a return address in the application. The method may further include detecting, at the return address, a check to be performed on the variable return value returned by the API call. The method may also include, in response to the detecting of the check, determining that the application is malicious. The method may further include performing a security action on the malicious application to prevent the malicious application from executing in the real-world computing environment.

20 Claims, 3 Drawing Sheets

(56) References Cited

U.S. PATENT DOCUMENTS

| | | | |
|---|---|---|---|
| 2018/0046799 A1* | 2/2018 | Kohavi | G06F 21/53 |
| 2018/0088988 A1* | 3/2018 | Rabet | G06F 9/485 |
| 2019/0132355 A1* | 5/2019 | Egbert | H04L 63/1416 |

* cited by examiner

DETECTING A MALICIOUS APPLICATION EXECUTING IN AN EMULATOR BASED ON A CHECK MADE BY THE MALICIOUS APPLICATION AFTER MAKING AN API CALL

BACKGROUND

An emulator, sometimes also referred to as a sandbox, is a virtual computing environment that emulates a real-world computing environment in order to fool a software application executing therein into believing that it is executing in the real-world computing environment. For example, if an application is suspected of being a potentially malicious application, such as a virus, ransomware, or malware, the application may first be executed, or quarantined, in an emulator for a quarantine time period. While executing in the emulator, the application can be monitored to determine if the application exhibits any malicious behaviors, sometimes referred to as malicious payloads. If so, the suspected application can be confirmed to be a malicious application and can be discarded. If not, the application can be approved for execution in the real-world computing environment as a clean application.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for detecting a malicious application executing in an emulator based on a check made by the malicious application after making an Application Programming Interface (API) call may be performed, at least in part, by a computing device including at least one processor. The method may include executing an application in an emulator that emulates a real-world computing environment. The method may also include detecting, in the application, an API call configured to accept a parameter and return a variable return value to a return address in the application. The method may further include detecting, at the return address, a check to be performed on the variable return value returned by the API call. The method may also include, in response to the detecting of the check, determining that the application is malicious. The method may further include performing a security action on the malicious application to prevent the malicious application from executing in the real-world computing environment.

In some embodiments, the method may further include detecting that the parameter is an invalid parameter that is hardcoded in the application and detecting that the variable return value is dependent on the invalid hardcoded parameter. In these embodiments, the determining that the application is malicious may be further in response to the detecting that the parameter is an invalid hardcoded parameter and the detecting that the variable return value is dependent on the invalid hardcoded parameter.

In some embodiments, the detecting of the check may further include evaluating the check to determine that the check is not simply checking for an error code in the variable return value. In some embodiments, the detecting of the check may further include correlating the check with the parameter to determine that the check is a non-standard check.

Further, in some embodiments, the variable return value may be dependent on the emulated computing environment. In some embodiments, the real-world computing environment may be a standard operating system, such as a Windows operating system, and the API call may be a standard API call of the standard operating system.

Also, in some embodiments, one or more non-transitory computer-readable media may include one or more computer-readable instructions that, when executed by one or more processors, cause the one or more processors to perform a method for detecting a malicious application executing in an emulator based on a check made by the malicious application after making an API call.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
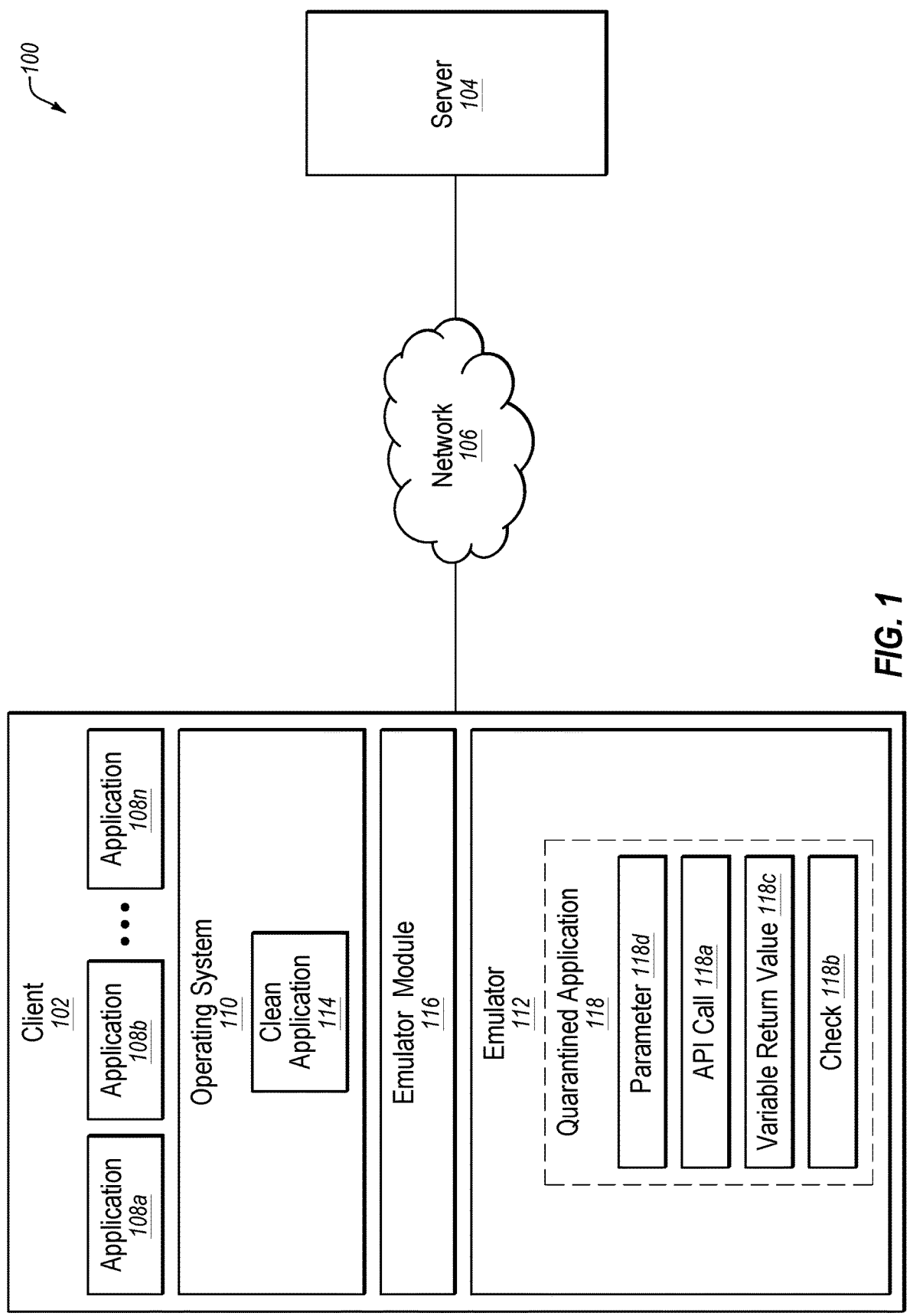
FIG. 1 illustrates an example system configured to detect a malicious application executing in an emulator based on a check made by the malicious application after making an API call.

While an emulator may be effective for executing and monitoring a suspected malicious application, purveyors of malicious applications have begun to develop more sophisticated malicious applications that are configured to detect being executed in an emulator in order to avoid exhibiting malicious behavior while executing in an emulator, thus avoiding detection as malicious applications.

One way in which a more sophisticated malicious application may detect being executed in an emulator is by checking whether the computing environment in which the malicious application is executing has all of the functionality expected in the real-world computing environment. Although emulators attempt to emulate a real-world computing environment, such as a standard operating system on a personal computer (PC), emulators generally only include a scaled-down (or lightweight) amount of the functionality of the real-world computing environment. For example, emulators are generally unable to handle all of the same API calls as the real-world computing environments that they emulate. A malicious application may attempt to exploit this difference between the real-world computing environment and the emulator by making an API call that the emulator may not be able to properly handle, and then checking whether the API call returns an expected return value. When the return value is unexpected, the malicious application may determine that the computing environment is an emulator rather than the real-world computing environment because it was unable to properly handle the API call. The malicious application may then purposely fail to exhibit any malicious behavior in order to avoid being identified as a malicious application while executing in the emulator, thus degrading the usefulness of the emulator.

The embodiments disclosed herein may detect a malicious application executing in an emulator based on a check made by the malicious application after making an API call. In some embodiments, when an application is executing in an emulator, the emulator may detect an API call made by the application. The emulator may then detect a check made by the application on a variable return value returned by the API call. Clean applications do not generally check variable return values because variable return values are dependent on variations in computing environments in which the API calls are made. Thus, clean applications do not generally check a variable return value for a specific value because the variations in computing environments make it difficult or impossible to know beforehand what specific value to expect. Instead of checking a variable return value for a specific value, clean applications generally just use whatever variable return value is returned by an API call. Thus, any check performed by an application on a variable return value may be suspicious. Therefore, even when the purpose of the check by the application of the variable return value is to determine that the application is executing within an emulator and to then avoid exhibiting malicious behavior, detection of the check itself may be sufficiently suspicious to indicate that the application is a malicious application.

In some embodiments, in addition to detecting a check by the application on a variable return value, the determination that an application is malicious may further include detecting that a parameter accepted by the API call is an invalid hardcoded parameter and detecting that the variable return value is dependent on the invalid parameter, which is further suspicious because a clean application would not check for a specific value in a variable return value when the specific value was guaranteed due to a dependency on a hardcoded parameter. Further, in some embodiments, in addition to detecting a check by the application on a variable return value, the determination that an application is malicious may also include determining that the check is not simply checking for an error code in the variable return value, since checks for error codes are not necessarily suspicious. Also, in some embodiments, in addition to detecting a check by the application on a variable return value, the determination that an application is malicious may also include correlating the check with a parameter accepted by the API call to determine that the check is a non-standard check, since standard checks are not necessarily suspicious.

Therefore, even where a malicious application is configured to use an API call to detect execution in an emulator and then conceal its malicious behavior, the embodiments disclosed herein may be employed to detect that the application is malicious, despite concealment of its malicious behavior, by virtue of the application performing a suspicious check of a variable return value returned by the API call. The embodiments disclosed herein may thus avoid a malicious application successfully exploiting the difference in functionality between a real-world computing environment and an emulator, thus making the emulator more useful and robust at detecting malicious applications.

Turning to the figures, FIG. 1 illustrates an example system 100 configured to detect a malicious application executing in an emulator based on a check made by the malicious application after making an API call. The system 100 may include a client 102, a server 104, and a network 106.

Figure 3:
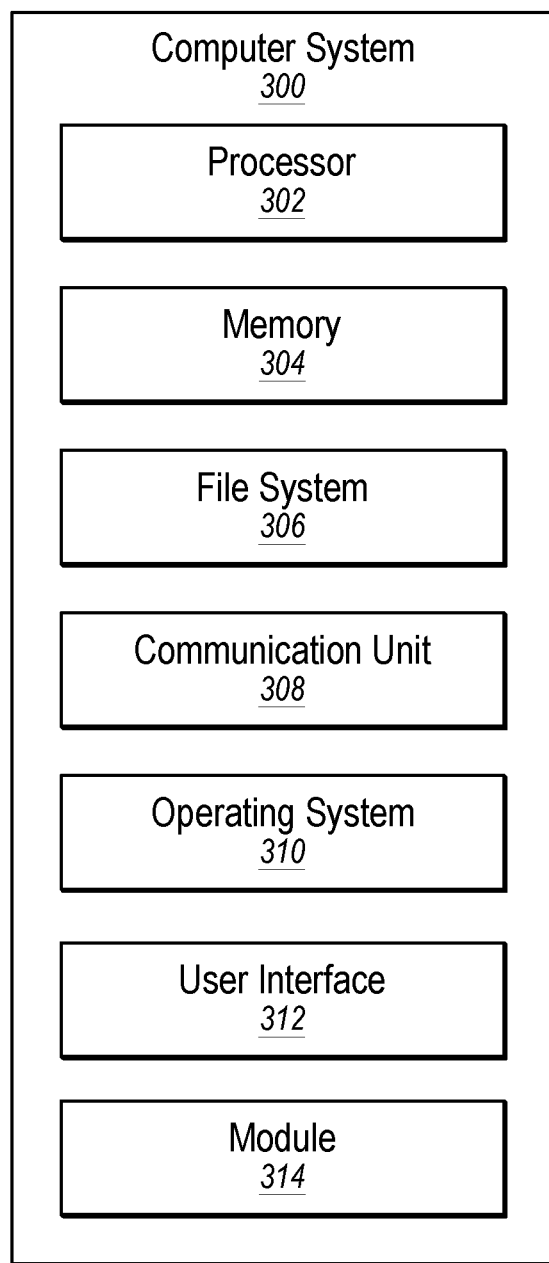
FIG. 3 illustrates an example computer system that may be employed in detecting a malicious application executing in an emulator based on a check made by the malicious application after making an API call.

In some embodiments, the client 102 may be any computer system, an example of which is disclosed herein in connection with the computer system 300 of FIG. 3. In some embodiments, the client 102 may be configured to communicate over the network 106 with the server 104. The client 102 may include applications 108a-108n. The applications 108a-108n may be executed on the client 102. When executing, the applications 108a-108n may be executed in a real-world computing environment, such as the computing environment provided by the operating system 110, or may be executed in a virtual computing environment, such as the emulator 112. For example, the application 108b may be executed as a clean application 114 in the computing environment provided by the operating system 110.

In some embodiments, the client 102 may also include an emulator module 116. The emulator module 116 may be employed to execute, or quarantine, one or more of the applications 108a-108n in the emulator 112. For example, the emulator module 116 may be employed to execute the application 108a as a quarantined application 118.

In some embodiments, the emulator module 116 may be configured to detect a malicious application executing in the emulator 112 based on a check made by the malicious application after making an API call. For example, the emulator module 116 may be configured to execute the application 108a in the emulator 112 as the quarantined application 118. While the quarantined application 118 is executing, the emulator module 116 may detect an API call 118a made by the quarantined application 118. The emulator module 116 may then detect the check 118b made by the quarantined application 118 on a variable return value 118c returned by the API call 118a. Since clean applications do not generally check variable return values, detection of the check 118b itself by the emulator module 116 may be sufficiently suspicious to indicate that the quarantined application 118 is a malicious application, even where the quarantined application 118 fails to exhibit any malicious behavior while executing in the emulator 112.

In some embodiments, in addition to detecting the check 118b by the quarantined application 118 on the variable return value 118c, the emulator module 116 may be further configured to determine that the quarantined application 118 is malicious due to the emulator module 116 detecting that a parameter 118d accepted by the API call 118a is an invalid hardcoded parameter and detecting that the variable return value 118c is dependent on the invalid hardcoded parameter. Further, in some embodiments, the emulator module 116 may be further configured to determine that the check 118b is not simply checking for an error code in the variable return value 118c, and/or to correlate the check 118b with the parameter 118d accepted by the API call 118a to determine that the check is a non-standard check.

For example, while executing the quarantined application 118, the emulator module 116 may encounter the following example code in the quarantined application 118:
  DWORD size_of_code=0;
  ReadFile(hFile, &size_of_code, 4, NULL, NULL);
  if   (size_of_code<0x171000||size_of_code>0x1ff000)
    exit( );
In this first code example, the API call "ReadFile" includes five parameters. The parameter "hFile" is a handle to a system Dynamic-Link Library (DLL), the parameter "&size_of_code" designates where to read in a Portable Executable (PE) structure, and the parameter "4" designates how many bytes to read. Also, in this example, the check "if (size_of_code<0x171000||size_of_code>0x1ff000)" is a check on the variable return value "size_of_code" and is performed because the quarantined application 118 knows that the variable return value "size_of_code" must be within a known range for a given system file. Further, in this example, the emulator module 116 may correlate the check with the parameter to determine that the check is a non-standard check. Here, the emulator module 116 may determine that the parameter "hFile" belongs to a system DLL. The emulator module 116 may further determine that it is standard to open a file, read four bytes of the file, and check that the four bytes are within a certain range, but that it is not standard to open a system DLL and check a particular field in a header of the PE structure. As such, the emulator module 116 may determine that this check is a non-standard check.

In a second example, while executing the quarantined application 118, the emulator module 116 may encounter the following example code in the quarantined application 118:

LONG size;
    RegQueryValue(hKey, NULL, NULL, &size);
    if (size !=133) exit( );

In this second code example, the API call "RegQueryValue" includes four parameters. The parameter "hKey" is a handle to a previously opened registry key which is known by the quarantined application 118 to exist in the real-world computing environment of the operating system 110 but perhaps not to exist in thinner emulators of the operating system 110, the first parameter "NULL" refers to the default value of the registry key, the second parameter "NULL" specifies to retrieve the size of the registry key instead of the value of the registry key. Also, in this example, the check "if (size !=133)" is a check on the variable return value "size" and is performed because the quarantined application 118 knows that the expected value of the variable return value "size" is "133". Further, in this example, the emulator module 116 may determine that the presence of the check in the example code indicates that the quarantined application 118 is a malicious application because clean applications generally go ahead and use the variable return value "size" to allocate the required size, rather than checking for a specific value for the variable return value "size".

In a third example, while executing the quarantined application 118, the emulator module 116 may encounter the following example code in the quarantined application 118:

HANDLE f=CreateFile(file_name, GENERIC_READ, FILE_SHARE_READ, 0, OPEN_EXISTING, 0, 0);
    if ((DWORD)f !=0x104) exit( );

In this third code example, the API call "CreateFile" includes seven parameters. The parameter "file_name" may be any file in a file system, which may make it very difficult for the emulator 112 to be able to read since the emulator 112 may not be able to keep track of all files in the file system. Also, in this example, the check "if ((DWORD)f !=0x104)" is a check on the variable return value "f" and is performed because the quarantined application 118 knows that the expected value of the variable return value "f" is "0x104". Further, in this example, the emulator module 116 may determine that the presence of the check in the example code indicates that the quarantined application 118 is a malicious application because clean applications would not generally check for a specific value for the variable return value "f", but would instead check for an error code, by performing the following standard check for example: "if (f==INVALID_HANDLE_VALUE) error( )".

In a fourth example, while executing the quarantined application 118, the emulator module 116 may encounter the following example code in the quarantined application 118:

HANDLE hProcessSnap=CreateToolhelp32Snapshot (TH32CS_SNAPPROCESS, 0);
    if((DWORD)hProcessSnap !=0x40480) return;

In this fourth code example, the API call "CreateToolhelp32Snapshot" includes two parameters, both of which are hardcoded. Also, in this example, the check "if((DWORD)hProcessSnap !=0x40480)" is a check on the variable return value "hProcessSnap" and is performed because the quarantined application 118 knows that the expected value of the variable return value "hProcessSnap" is "0x40480". Further, in this example, the emulator module 116 may determine that the presence of the check in the example code indicates that the quarantined application 118 is a malicious application because clean applications would not generally check for a specific value for the variable return value "hProcessSnap", but would instead check for an error code, by performing the following standard check for example: "if (hProcessSnap==INVALID_HANDLE_VALUE) error( )".

In a fifth example, while executing the quarantined application 118, the emulator module 116 may encounter the following example code in the quarantined application 118:

Int iRet=MsiViewModify(MSIHANDLE hView, MSIMODIFY eModifyMode, MSIHANDLE hRecord);
    if (iRet==ERROR_INVALID_PARAMETER) return;

In this fifth code example, the API call "MsiViewModify" includes three parameters. The parameter "eModifyMode" is hardcoded and invalid because it is not in a valid range of −1 to 11. In this example, the check "if (iRet==ERROR_INVALID_PARAMETER)" is a check on the variable return value "iRet" and is performed because the quarantined application 118 knows that it has intentionally passed the invalid hardcoded parameter and thus expects a particular error if the computing environment is able to handle the API call. Also, in this example, the emulator module 116 may determine that the presence of the check in the example code, coupled with the invalid hardcoded parameter, indicates that the quarantined application 118 is malicious.

In a sixth example, while executing the quarantined application 118, the emulator module 116 may encounter the following example code in the quarantined application 118:

Int iRet=SHQueryValueEx(HKEY hkey, LPCTSTR pszValue, LPDWORD pdwReserved, LPDWORD pdwType, LPVOID pvData, LPDWORD pcbData);
    if (iRet==ERROR_INVALID_PARAMETER) return;

In this sixth code example, the API call "SHQueryValueEx" includes six parameters. The parameters "pvData" and "pcbData" are invalid. In this example, the check "if (iRet==ERROR_INVALID_PARAMETER)" is a check on the variable return value "iRet" and is performed because the quarantined application 118 knows that it has intentionally passed the invalid parameters "pvData" and "pcbData" and thus expects a particular error if the computing environment is able to handle the API call "SHQueryValueEx". Also, in this example, the emulator module 116 may determine that the presence of the check in the example code, coupled with the invalid parameters, indicates that the quarantined application 118 is malicious.

In a seventh example, while executing the quarantined application 118, the emulator module 116 may encounter the following example code in the quarantined application 118:

Int iRet=QueryDosDevice(LPCTSTR lpDeviceName, LPTSTR lpTargetPath, DWORD ucchMax);
    if (iRet==ERROR_SUCCESS) return;

In this seventh code example, the API call "QueryDosDevice" includes three parameters. The parameter "lpDeviceName" is invalid because it does not follow naming conventions and is hardcoded. In this example, the check "if (iRet==ERROR_SUCCESS)" is a check on the variable return value "iRet" and is performed because the quarantined application 118 knows that it has intentionally passed the invalid hardcoded parameters "lpDeviceName" and thus expects a particular error if the computing environment is able to handle the API call "QueryDosDevice". Also, in this example, the emulator module 116 may determine that the presence of the check in the example code, coupled with the invalid hardcoded parameter, indicates that the quarantined application 118 is malicious.

Therefore, the emulator module 116 may avoid a malicious application successfully exploiting the difference in functionality between the computing environment of the operating system 110 and the computing environment of the emulator 112, thus making the emulator 112 more useful and robust at detecting malicious applications.

In some embodiments, the server 104 may be any computer system, an example of which is disclosed herein in connection with the computer system 300 of FIG. 3. In some embodiments, the server 104 may be configured to facilitate communication sessions between the client 102, the server 104, and/or other similar clients or servers over the network 106. For example, the server 104 may operate as a web server and host a website that can be accessed using web browsers executing on the client 102 and other similar clients. In another example, the server 104 may operate as an exchange configured to establish communication sessions, such as telephone calls, video calls, and data sharing sessions between systems or devices such as the client 102 and another system or device. In some embodiments, the server 104 may be configured similarly to the client 102, with each of the components 108a-118d. Therefore, the capability of the components 108a-118d of the client 102 may be replicated on the server 104.

In some embodiments, the network 106 may be configured to communicatively couple the client 102 and the server 104 as well as other similar systems and/or devices. In some embodiments, the network 106 may be any wired or wireless network, or combination of multiple networks, configured to send and receive communications between systems and devices. In some embodiments, the network 106 may include a Personal Area Network (PAN), a Local Area Network (LAN), a Metropolitan Area Network (MAN), a Wide Area Network (WAN), a Storage Area Network (SAN), or some combination thereof. In some embodiments, the network 106 may also be coupled to, or may include, portions of a telecommunications network, including telephone lines, for sending data in a variety of different communication protocols, such as a cellular network or a Voice over IP (VoIP) network.

Modifications, additions, or omissions may be made to the system 100 without departing from the scope of the present disclosure. For example, in some embodiments, only a single client 102, or a single server 104 with components similar to the client 102, may be employed. Further, in some embodiments, the system 100 may include additional devices and systems similar to the devices and systems illustrated in FIG. 1 that each may be configured similarly to the devices and systems illustrated in FIG. 1.

Figure 2:
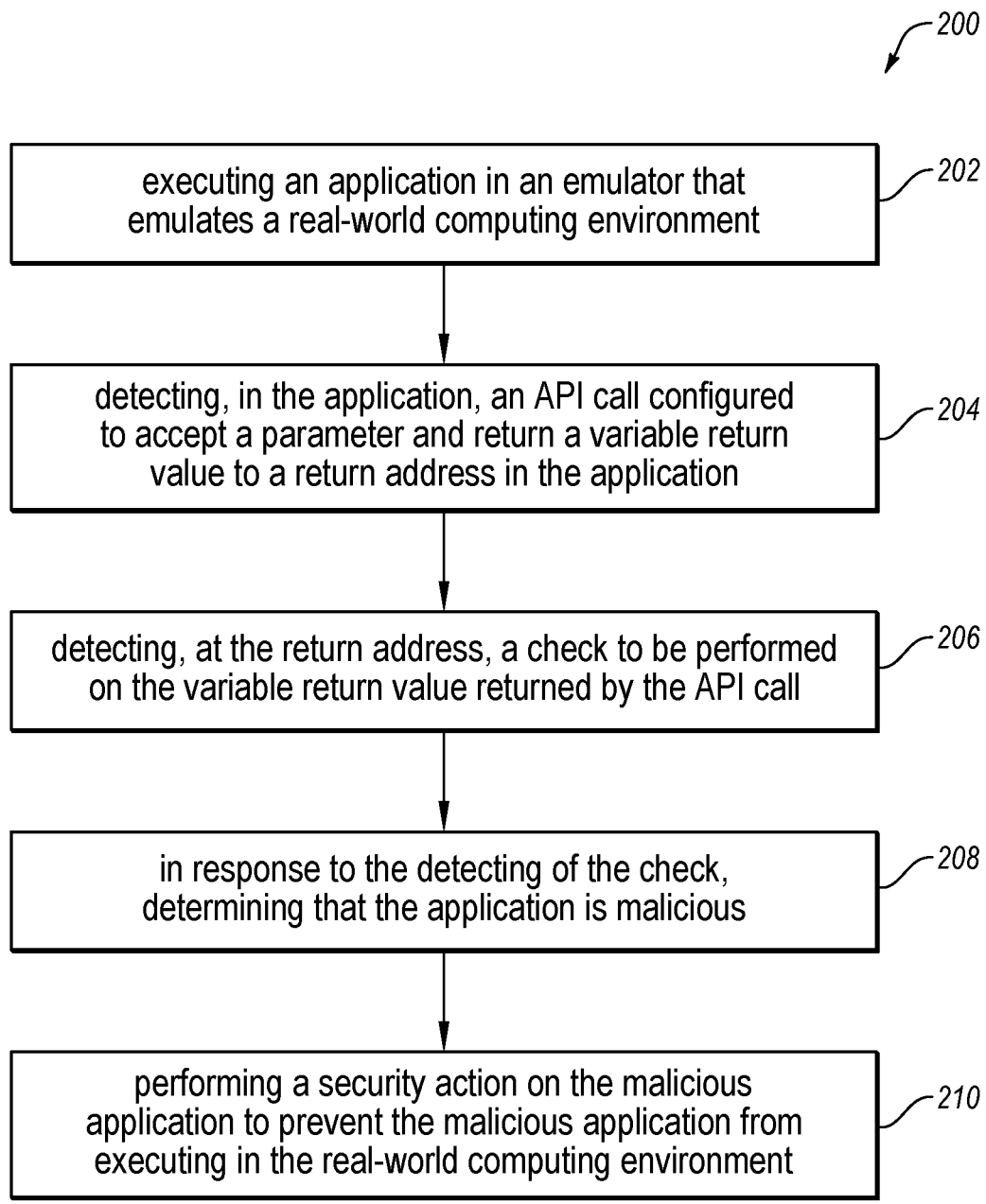
FIG. 2 is a flowchart of an example method for detecting a malicious application executing in an emulator based on a check made by the malicious application after making an API call.

FIG. 2 is a flowchart of an example method 200 for detecting a malicious application executing in an emulator based on a check made by the malicious application after making an API call. The method 200 may be performed, in some embodiments, by one or more devices or systems, such as by the operating system 110, the emulator 112, and/or the emulator module 116 executing on the client 102 of FIG. 1. In these and other embodiments, the method 200 may be performed by one or more processors based on one or more computer-readable instructions stored on one or more non-transitory computer-readable media. The method 200 will now be described in connection with FIGS. 1 and 2.

The method 200 may include, at block 202, executing an application in an emulator that emulates a real-world computing environment. In some embodiments, the real-world computing environment may be a standard operating system, such as a Windows operating system. For example, the emulator module 116 may execute, at block 202, the application 108a in the emulator 112 as the quarantined application 118. As noted above, the emulator 112 may emulate the computing environment of the operating system 110, which may be a standard operating system such as a Windows operating system.

The method 200 may include, at block 204, detecting, in the application, an API call configured to accept a parameter and return a variable return value to a return address in the application. In some embodiments, the API call may be a standard API call of a standard operating system. For example, the emulator module 116 may detect, at block 204, the API call 118a in the quarantined application 118. The API call 118a may be configured to accept a parameter 118d and return a variable return value 118c to a return address in the quarantined application 118. The API call 118a may be a standard API call of a standard operating system, such as the operating system 110.

The method 200 may include, at block 206, detecting, at the return address, a check to be performed on the variable return value returned by the API call. In some embodiments, the variable return value may be dependent on the emulated computing environment. For example, the emulator module 116 may detect, at block 206, the check 118b to be performed on the variable return value 118c returned by the API call 118a. The variable return value 118c may be dependent on the emulated computing environment of the emulator 112.

In some embodiments, the detecting of the check at block 206 may further include detecting that the parameter is an invalid parameter that is hardcoded in the application and detecting that the variable return value is dependent on the invalid hardcoded parameter. For example, after detecting the check 118b at block 206, the emulator module 116 may further detect, at block 206, that the parameter 118d is an invalid parameter that is hardcoded in the quarantined application 118 and may detect that the variable return value 118c is dependent on the invalid hardcoded parameter.

In some embodiments, the detecting of the check at block 206 may further include evaluating the check to determine that the check is not simply checking for an error code in the variable return value. For example, after detecting the check 118b at block 206, the emulator module 116 may further evaluate, at block 206, the check 118b to determine that the check 118b is not simply checking for an error code in the variable return value 118c.

In some embodiments, the detecting of the check at block 206 may further include correlating the check with the parameter to determine that the check is a non-standard check. For example, after detecting the check 118b at block 206, the emulator module 116 may further correlate, at block 206, the check 118b with the parameter 118d to determine that the check 118b is a non-standard check.

The method 200 may include, at block 208, in response to the detecting of the check, determining that the application is malicious. For example, the emulator module 116 may determine, at block 208, that the quarantined application 118 is malicious in response to the detecting, at block 206, of the check 118b.

In some embodiments, the determining that the application is malicious at block 208 may be further in response to the detecting, at block 206, that the parameter is an invalid hardcoded parameter and to the detecting, at block 206, that the variable return value is dependent on the invalid hardcoded parameter. For example, the emulator module 116 may determine, at block 208, that the quarantined application 118 is malicious in response to the further detecting, at block 206, that the parameter 118d is an invalid hardcoded parameter and to the further detecting, at block 206, that the variable return value 118c is dependent on the invalid hardcoded parameter.

The method 200 may include, at block 210, performing a security action on the malicious application to prevent the malicious application from executing in the real-world computing environment. In some embodiments, the performing of the security action may include removing the malicious application from the real-world computing environment or quarantining the malicious application in the real-world computing environment. For example, the emulator module 116 may perform, at block 210, a security action on the application 108a, which was determined to be malicious at block 208, to prevent the application 108a from executing in the computing environment of the operating system 110. This security action may include removing the application 108a from the client 102 or quarantining the application 108a on the client 102.

The method 200 may thus be employed, in some embodiments, to detect a malicious application executing in an emulator based on a check made by the malicious application after making an API call. In some embodiments, detecting a malicious application employing the method 200 may avoid a malicious application successfully exploiting the difference in functionality between the computing environment of an operating system and the computing environment of the emulator, thus making the emulator more useful and robust at detecting malicious applications.

Although the blocks of the method 200 are illustrated in FIG. 2 as discrete blocks, various blocks may be divided into additional blocks, combined into fewer blocks, reordered, expanded, or eliminated, depending on the desired implementation.

Further, it is understood that the method 200 may improve the functioning of a computer system itself. For example, the functioning of the client 102 of FIG. 1 may itself be improved by the method 200 because a potentially malicious application may be quarantined in the emulator 112, and then the potentially malicious application may be determined to be a malicious application in response to the detection of a check to be performed on a variable return value returned by the API call in the malicious application. In this manner, the method 200 may avoid a malicious application successfully exploiting the difference in functionality between the computing environment of an operating system and the computing environment of the emulator, thus making the emulator more useful and robust at detecting malicious applications, unlike conventional emulators which may be exploited by purveyors of malicious applications due to these differences in functionality.

Also, the method 200 may improve the technical field of malicious application detection at least because conventional emulator configurations do not detect a malicious application where the application fails to exhibit malicious behavior. The ability of the emulator disclosed herein to detect malicious applications by detecting a check following an API call may make the emulator more useful and robust at detecting malicious applications.

FIG. 3 illustrates an example computer system 300 that may be employed in detecting a malicious application executing in an emulator based on a check made by the malicious application after making an API call. In some embodiments, the computer system 300 may be part of any of the systems or devices described in this disclosure. For example, the computer system 300 may be part of the client 102 or the server 104 of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more blocks of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more blocks of the method 200 of FIG. 2. These computer-executable instructions may be included, for example, in the operating system 310, in one or more applications, such as the module 314, or in some combination thereof.

The communication unit 308 may include any component, device, system, or combination thereof configured to transmit or receive information over a network, such as the network 106 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300, and may correspond to the operating system 110 of FIG. 1.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more blocks of the method 200 of FIG. 2. In some embodiments, the module 314 may be part of the operating system 310 or may be part of an application of the computer system 300, or may be some combination thereof. In some embodiments, the module 314 may function as the emulator module 116 and/or the emulator 112 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for detecting a malicious application executing in an emulator based on a check made by the malicious application after making an API call, at least a portion of the method being performed by a computing device comprising at least one processor, the method comprising:
   executing an application in an emulator that emulates a real-world computing environment;
   detecting, in the application, an API call configured to accept a parameter and return a variable return value to a return address in the application;
   detecting, at the return address, a check to be performed on the variable return value returned by the API call;
   in response to the detecting of the check, determining that the application is malicious; and
   performing a security action on the malicious application to prevent the malicious application from executing in the real-world computing environment.

2. The method of claim 1, wherein the detecting of the check further comprises evaluating the check to determine that the check is not simply checking for an error code in the variable return value.

3. The method of claim 1, wherein the detecting of the check further comprises detecting that the parameter is an invalid parameter that is hardcoded in the application and detecting that the variable return value is dependent on the invalid hardcoded parameter.

4. The method of claim 1, wherein the detecting of the check further comprises correlating the check with the parameter to determine that the check is a non-standard check.

5. The method of claim 1, wherein the variable return value is dependent on the emulated computing environment.

6. The method of claim 1, wherein the real-world computing environment is a standard operating system and the API call is a standard API call of the standard operating system.

7. The method of claim 6, wherein the standard operating system is a Windows operating system.

8. A computer-implemented method for detecting a malicious application executing in an emulator based on a check made by the malicious application after making an API call, at least a portion of the method being performed by a computing device comprising at least one processor, the method comprising:
   executing an application in an emulator that emulates a real-world computing environment;
   detecting, in the application, an API call configured to accept a parameter and return a variable return value to a return address in the application;
   detecting, at the return address, a check to be performed on the variable return value returned by the API call;
   detecting that the parameter is an invalid parameter that is hardcoded in the application;
   detecting that the variable return value is dependent on the invalid hardcoded parameter;
   in response to the detecting of the check, the detecting that the parameter is an invalid hardcoded parameter, and the detecting that the variable return value is dependent on the invalid hardcoded parameter, determining that the application is malicious; and
   performing a security action on the malicious application to prevent the malicious application from executing in the real-world computing environment.

9. The method of claim 8, wherein the detecting of the check further comprises evaluating the check to determine that the check is not simply checking for an error code in the variable return value.

10. The method of claim 8, wherein the variable return value is dependent on the emulated computing environment.

11. The method of claim 8, wherein the real-world computing environment is a standard operating system.

12. The method of claim 11, wherein the API call is a standard API call of the standard operating system.

13. The method of claim 11, wherein the standard operating system is a Windows operating system.

14. One or more non-transitory computer-readable media comprising one or more computer-readable instructions that, when executed by one or more processors of one or more computing devices, cause the one or more computing devices to perform a method for detecting a malicious application executing in an emulator based on a check made by the malicious application after making an API call, at least a portion of the method being performed by a computing device comprising at least one processor, the method comprising:
   executing an application in an emulator that emulates a real-world computing environment;
   detecting, in the application, an API call configured to accept a parameter and return a variable return value to a return address in the application;
   detecting, at the return address, a check to be performed on the variable return value returned by the API call;
   in response to the detecting of the check, determining that the application is malicious; and
   performing a security action on the malicious application to prevent the malicious application from executing in the real-world computing environment.

15. The one or more non-transitory computer-readable media of claim 14, wherein the detecting of the check further comprises evaluating the check to determine that the check is not simply checking for an error code in the variable return value.

16. The one or more non-transitory computer-readable media of claim 14, wherein the detecting of the check further comprises detecting that the parameter is an invalid parameter that is hardcoded in the application and detecting that the variable return value is dependent on the invalid hardcoded parameter.

17. The one or more non-transitory computer-readable media of claim 14, wherein the detecting of the check further comprises correlating the check with the parameter to determine that the check is a non-standard check.

18. The one or more non-transitory computer-readable media of claim 14, wherein the variable return value is dependent on the emulated computing environment.

19. The one or more non-transitory computer-readable media of claim 14, wherein the real-world computing environment is a standard operating system and the API call is a standard API call of the standard operating system.

20. The one or more non-transitory computer-readable media of claim 19, wherein the standard operating system is a Windows operating system.

* * * * *